(12) United States Patent
Roberge

(10) Patent No.: US 8,381,503 B2
(45) Date of Patent: Feb. 26, 2013

(54) INTERMESHED FEEDING SYSTEM FOR ROUND BALERS

(75) Inventor: Martin J. Roberge, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 13/149,777

(22) Filed: May 31, 2011

(65) Prior Publication Data

US 2012/0304612 A1 Dec. 6, 2012

(51) Int. Cl.
*A01D 39/00* (2006.01)

(52) U.S. Cl. ........................................................ 56/341

(58) Field of Classification Search ... 56/16.4 A–16.4 C, 56/341, 344, 364, DIG. 20
See application file for complete search history.

(56) References Cited

U.S. PATENT DOCUMENTS

| | | | |
|---|---|---|---|
| 1,486,360 A | | 3/1924 | Brown |
| 3,027,050 A | * | 3/1962 | Hansen ........................ 222/136 |
| 4,409,783 A | * | 10/1983 | Gaeddert ........................ 56/341 |
| 4,446,678 A | | 5/1984 | Smith |
| 4,464,889 A | * | 8/1984 | Weelink ........................ 56/341 |
| 4,581,880 A | * | 4/1986 | Klinner ........................ 56/364 |
| 4,766,717 A | * | 8/1988 | Thomann ........................ 56/341 |
| 4,841,718 A | * | 6/1989 | Sund ................................ 56/364 |
| 5,450,704 A | * | 9/1995 | Clostermeyer .................. 53/118 |
| 5,819,517 A | | 10/1998 | Amanatidis et al. |
| 5,848,523 A | * | 12/1998 | Engel et al. ........................ 56/341 |
| 6,079,324 A | * | 6/2000 | Feraboli et al. .................. 100/40 |
| 6,279,304 B1 | | 8/2001 | Anstey et al. |
| 6,874,311 B2 | | 4/2005 | Lucand et al. |
| 6,948,300 B1 | * | 9/2005 | Bandstra et al. ................. 56/341 |
| 7,124,568 B2 | * | 10/2006 | Hotaling .......................... 56/341 |
| 7,716,910 B2 | | 5/2010 | Woodford |
| 8,096,102 B2 | * | 1/2012 | Smith ............................. 56/364 |
| 2010/0071339 A1 | * | 3/2010 | Viaud et al. ...................... 56/341 |

FOREIGN PATENT DOCUMENTS

| | | |
|---|---|---|
| EP | 0064112 A1 | 11/1982 |
| EP | 0803184 A1 | 10/1997 |

* cited by examiner

*Primary Examiner* — Thomas B Will
*Assistant Examiner* — Mai Nguyen
(74) *Attorney, Agent, or Firm* — Patrick M. Sheldrake

(57) ABSTRACT

An improved crop pickup apparatus for a round baler in which the pickup apparatus substantially wider than the bale chamber inlet opening. The pickup apparatus includes a transversely aligned, overshot crop feed rotor positioned longitudinally between the forwardly disposed pickup tine reel and the rearwardly disposed floor roll. The feed rotor comprises a plurality of generally radially extending feed fingers that intermesh with a plurality of circumferential grooves on the floor roll and tines on the tine reel thereby enabling the spacing between the rotational axes of the floor roll, tine reel, and feed rotor to be reduced compared to a non-intermeshing arrangement. The intermeshed relationship also strips crop from the feed rotor without the use of a separate crop stripping device. The feed rotor further comprises a pair of tapered feed augers arranged on the feed rotor rotational axis positioned outboard of the inlet opening. The auger taper improves crop movement from the outboard portions of the pickup apparatus to the feed rotor feed fingers.

17 Claims, 5 Drawing Sheets

INTERMESHED FEEDING SYSTEM FOR ROUND BALERS

BACKGROUND OF THE INVENTION

The present invention relates generally to a baler for forming cylindrical bales of crop material, commonly referred to as a round baler, and more particularly to an improvement in a crop pickup apparatus for a round baler having lateral converging apparatus working in conjunction with a pickup that is wider than the bale forming chamber inlet.

Round balers rely on a pickup apparatus with a set of tines that engage a windrow of crop material on the ground and lift it upwardly and then urge it rearwardly to a transverse infeed opening into a bale-forming chamber. Pressure to increase efficiency in crop packaging operations has resulted in the prevalence of crop pickup units that are significantly wider than the bale forming chamber into which the crop material is fed. A wider pickup allows the baler to handle wider crop windrows and also results in better crop fill at the lateral ends of the resultant bale. Historically, wide pickups have incorporated augers situated at the outboard extremes of the pickup width to converge the crop laterally inwardly to achieve a width of the crop mat being fed into the bale chamber that is approximately the same as the chamber width. Longitudinal space in the pickup assembly for the converging augers generally requires an elongated feed table, increasing the distance the crop must travel between the pickup tines and the bale chamber inlet opening. A secondary feed mechanism, such as a stuffer or overshot feed rotor, positioned between the pickup tine reel and the bale chamber inlet is often necessary to convey the converged crop mat along the lengthened feed table and into the bale chamber.

Although quite effective, secondary feed mechanisms typically require further separation between the pickup tines and the bale chamber inlet opening. Lengthening the crop feed path between the pickup tine reel and the bale chamber inlet places greater reliance on the secondary feed mechanism and its crop movement efficiency.

It would be a great advantage to provide a secondary feed mechanism for use on a round baler having a pickup unit substantially wider than the bale forming chamber that minimizes the increase in the crop feed path length necessary to contain the secondary feed mechanism while providing a crop pick up assembly that efficiently conveys crop material from the ground to the bale-forming chamber with reduced incidence of clogging that overcomes the above problems and limitations.

SUMMARY OF THE INVENTION

Accordingly, the present invention, in any of the embodiments described herein, may provide one or more of the following advantages:

It is an object of the present invention to provide a crop pickup unit for use on a round baler that incorporates an overshot feed rotor rearwardly disposed from a pick tine reel and having a plurality of radially arranged fingers that extend into the crop flow to urge crop between the pickup tines and the baler inlet opening.

It is a further object of the present invention to provide a crop pickup unit having an overshot crop conveying apparatus in which a plurality of generally radially arranged fingers intermesh with tines on the pickup tine reel to continuously urge crop material from the pickup tine to the bale chamber infeed throat opening.

It is a further object of the present invention to provide a floor roll defining a portion of the crop inlet opening to the bale chamber, the floor roll having a plurality of circumferentially arranged recesses configured to intermesh with a plurality of generally radially arranged fingers provided on an overshot feed rotor forwardly disposed from the floor roll, the intermeshing enabling the separation of the rotational centerlines of the floor roll and the feed rotor to be reduced compared to the separation of non-intermeshed rolls.

It is a further object of the present invention to provide a crop pickup assembly that is substantially wider than the bale chamber inlet opening and incorporates a simple secondary crop conveyor rotatably disposed along a transverse rotational axis between a forward pickup tine reel and the rearward inlet opening, the secondary crop conveyor having a plurality of generally radially extending fingers for engaging and urging crop material toward the inlet opening disposed forwardly adjacent to the inlet opening and co-axial augers positioned laterally outboard of the inlet opening to urge crop material laterally inwardly toward the bale chamber inlet and reduce the incidence of crop jamming.

It is a still further object of the present invention to provide a crop pickup assembly having a overshot feed rotor positioned between the pickup tine reel and the bale chamber inlet floor roll wherein a plurality feed fingers on the feed rotor intermesh with a plurality of circumferential grooves in the floor to strip crop material from the feed fingers and eliminate the need for a separate crop stripping device for the feed roll.

It is a still further object of the present invention to provide an intermeshing crop feed system for a crop pickup assembly that is substantially wider than a crop inlet opening on a round baler that is durable in construction, inexpensive of manufacture, carefree of maintenance, easily assembled, and simple and effective to use.

These and other objects are achieved by providing an improved crop pickup apparatus for a round baler in which the pickup apparatus substantially wider than the bale chamber inlet opening. The pickup apparatus includes a transversely aligned, overshot crop feed rotor positioned longitudinally between the forwardly disposed pickup tine reel and the rearwardly disposed floor roll. The feed rotor comprises a plurality of generally radially extending feed fingers that intermesh with a plurality of circumferential grooves on the floor roll and tines on the tine reel thereby enabling the spacing between the rotational axes of the floor roll, tine reel, and feed rotor to be reduced compared to a non-intermeshing arrangement. The intermeshed relationship also strips crop from the feed rotor without the use of a separate crop stripping device. The feed rotor further comprises a pair of tapered feed augers arranged on the feed rotor rotational axis positioned outboard of the inlet opening. The auger taper improves crop movement from the outboard portions of the pickup apparatus to the feed rotor feed fingers.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
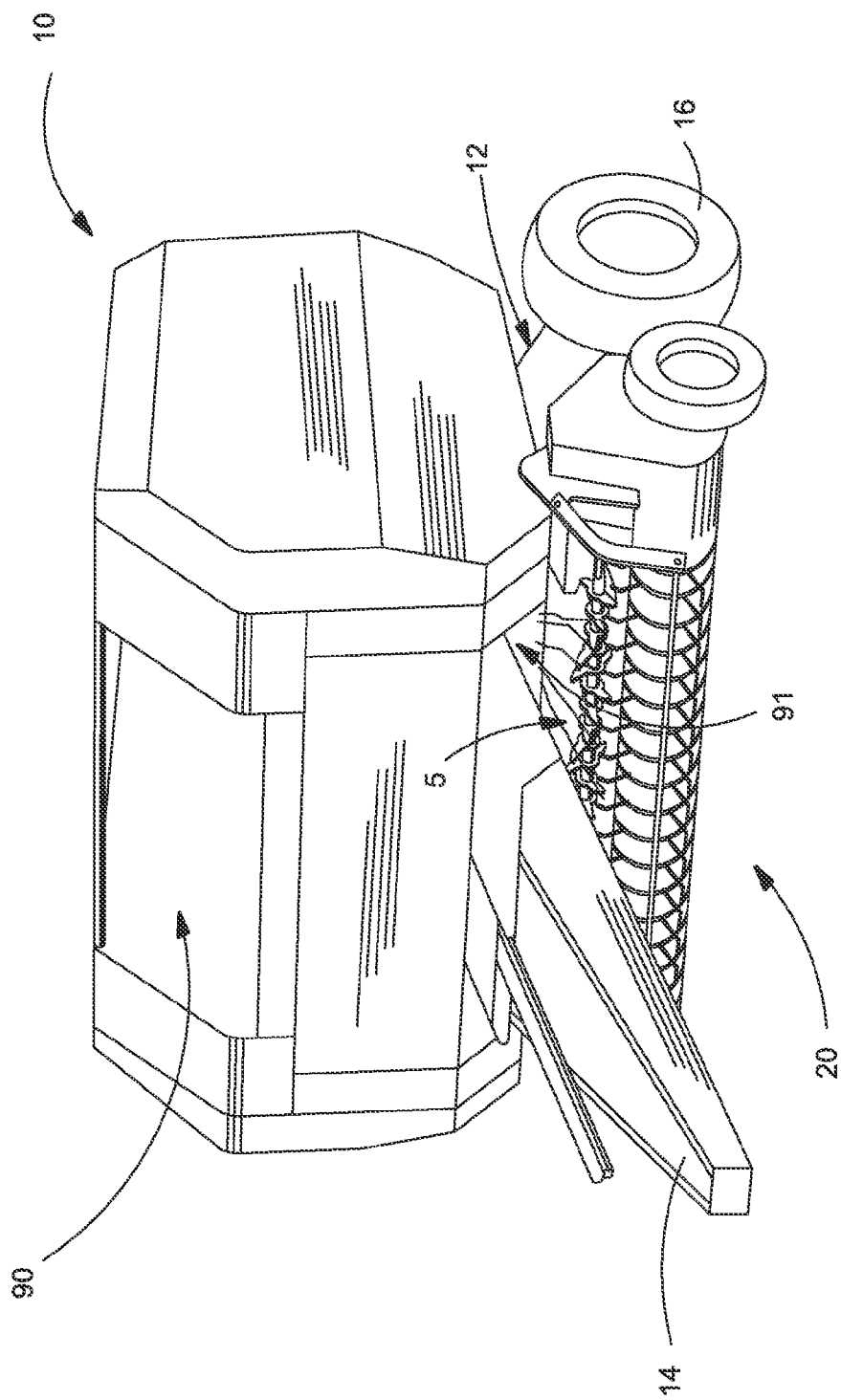
FIG. 1 shows an front perspective view of an agricultural round baler of the type on which the present invention is useful.

FIG. 1 illustrates a round baler 10 having a frame 12, a hitch 14, a pickup assembly 20, a bale-forming chamber 90 and a pair of supporting wheels 16 (only one shown) enabling the baler to be towed along the ground by a tractor or other similar prime mover and gather crop material 5 from the ground for packaging. As is well known, the bale chamber is defined by a plurality of rolls and movable belts which act upon incoming crop material to spirally wind the crop material into a generally cylindrically-shaped bale, wrap the bale, and eject the bale upon completion.

Figure 2:
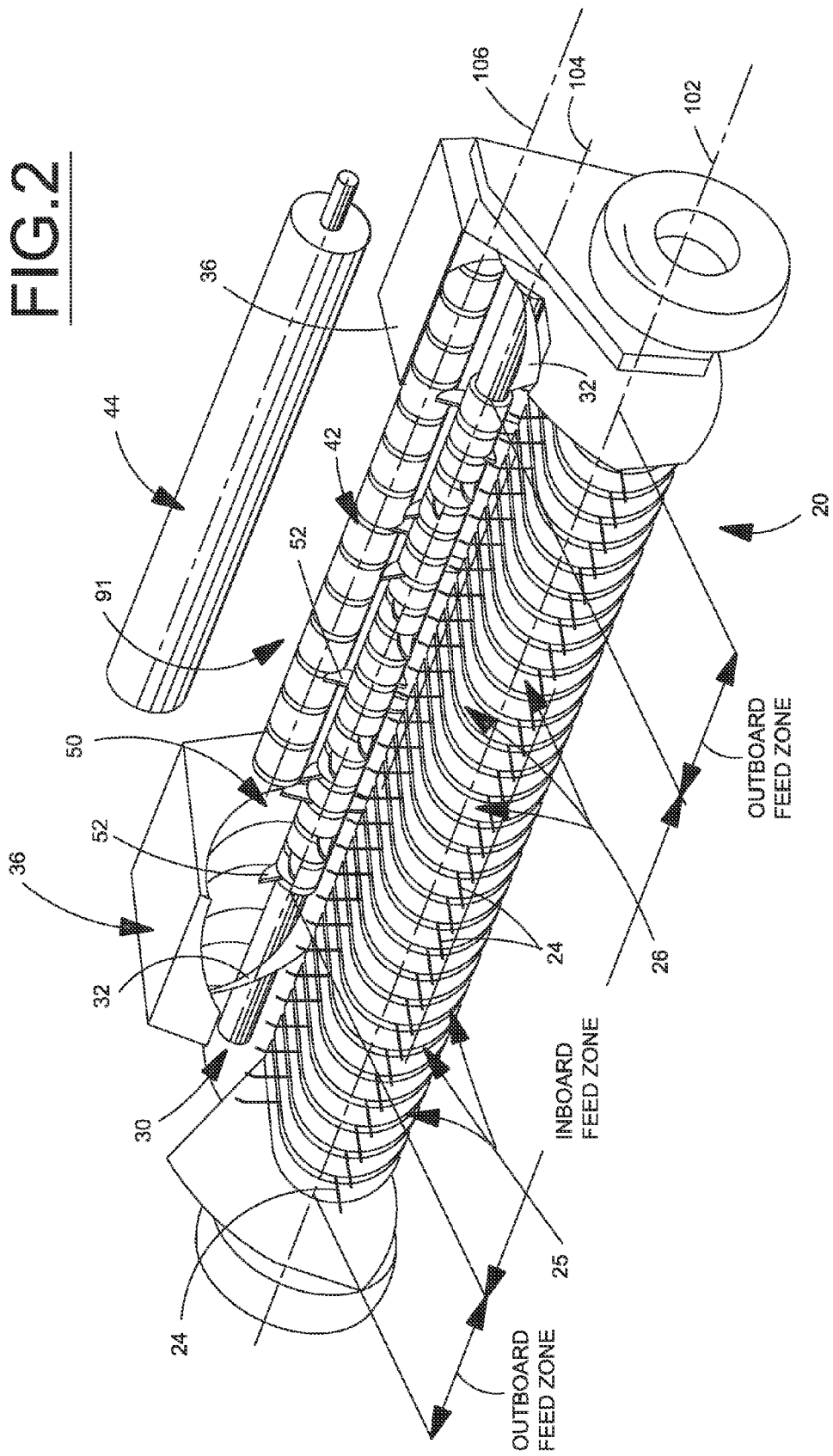
FIG. 2 is a partial perspective view of the pickup assembly used on the round baler in FIG. 1 showing one embodiment of the present invention.
Figure 3:
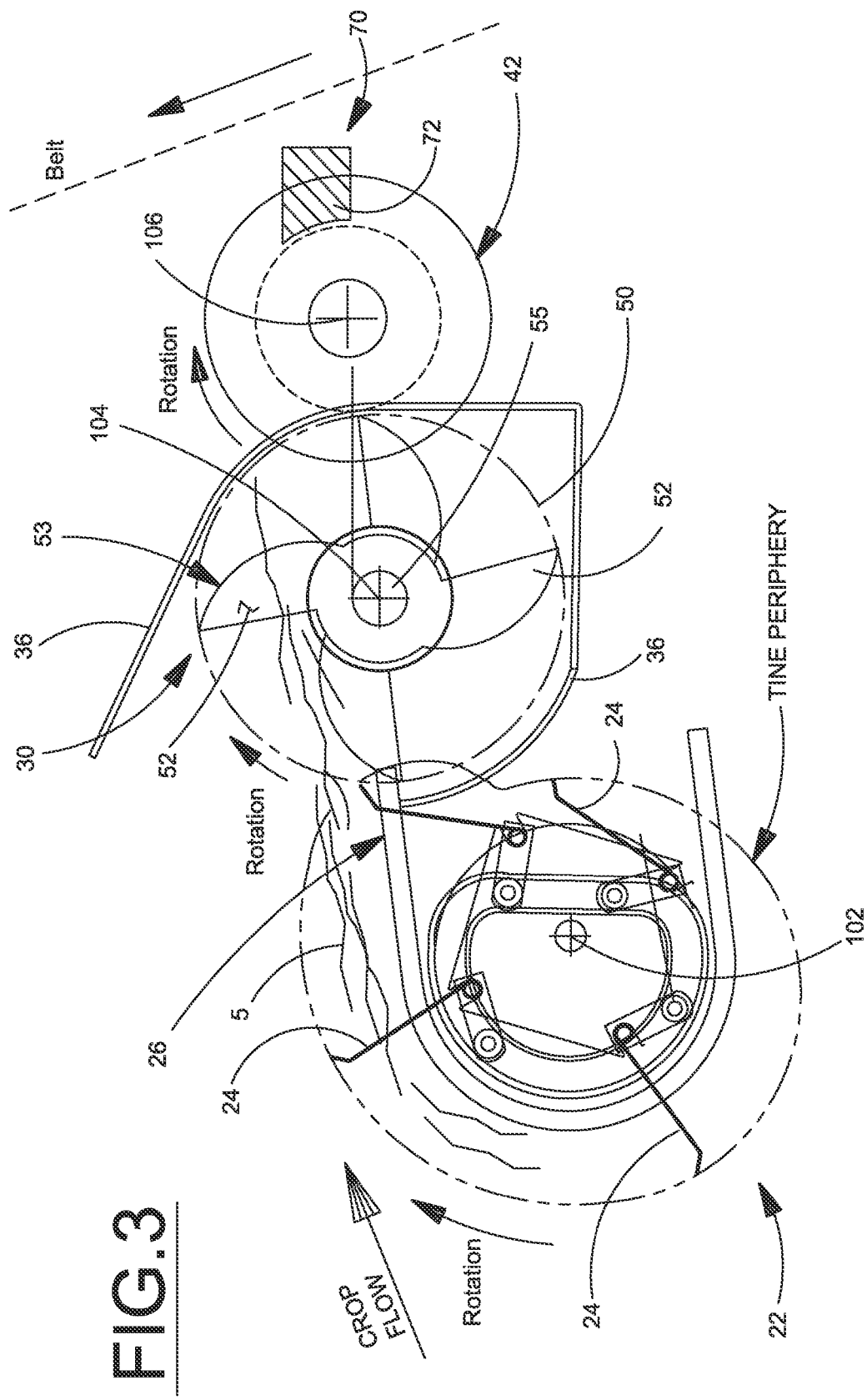
FIG. 3 is a partial side view of the pickup assembly of FIG. 2 showing the spatial relationship between various rotating elements of the pickup assembly and a first embodiment of the intermeshed feed rolls of the present invention.
Figure 4:
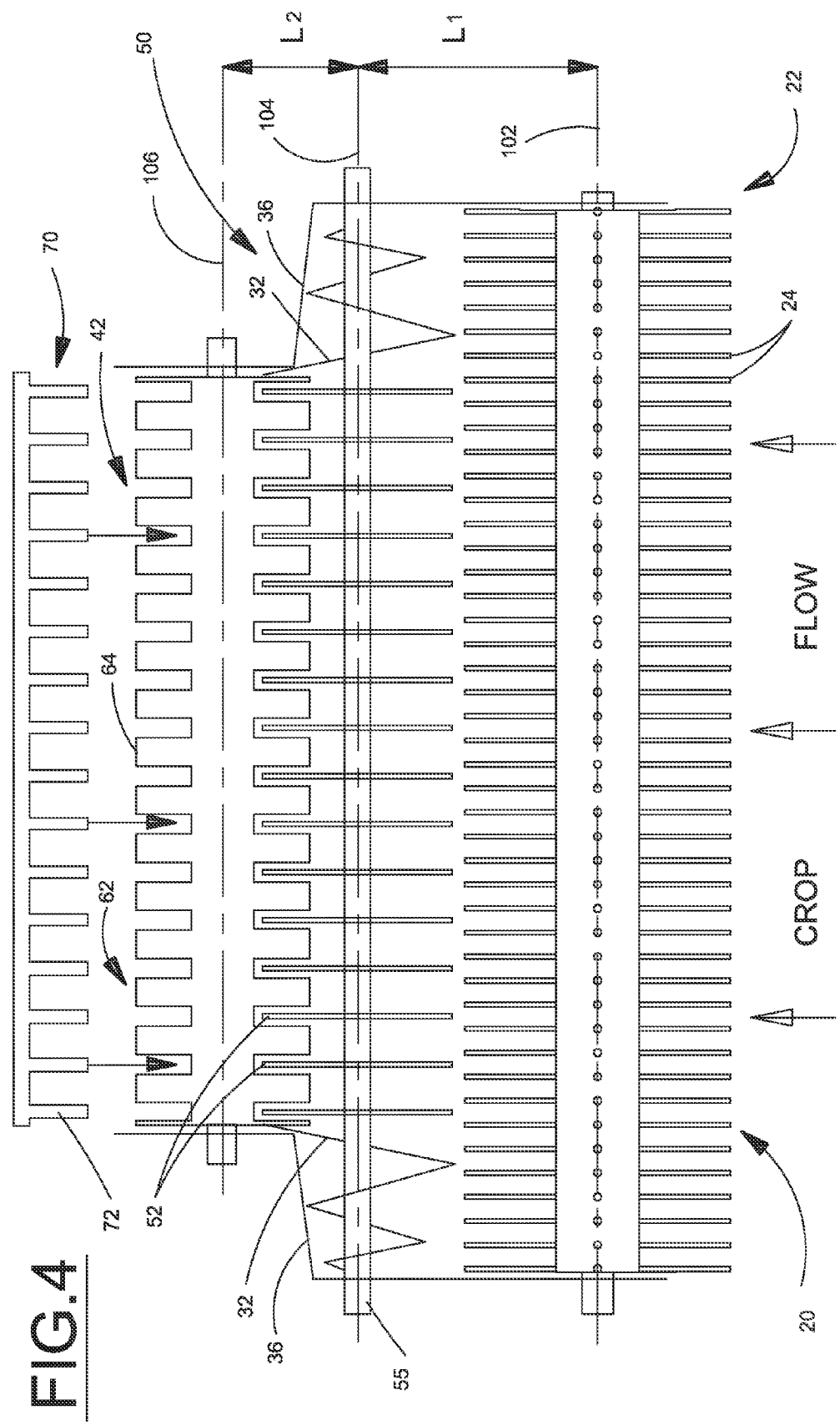
FIG. 4 is a partial plan view of the pickup assembly of FIG. 2 showing the spatial relationship of the various rotating elements of the intermeshed feed rolls of the present invention.

Now referring to FIGS. 1 and 2, as baler 10 is towed across a field, pickup tines 24 mounted on a rotating tine reel 22 lift the crop material, usually in a windrow, from the ground and move the crop material onto a crop feeding transition area defined by a plurality of rearwardly extending tine guards 26 at the rearward portion of pickup assembly 20. The tine guards 26 are laterally spaced-apart to define a series of generally parallel, longitudinally extending openings 25 through which the tines 24 project. The tine guards 26 guide crop material generally rearwardly and away from the tine reel 22 mechanism (shown on FIG. 3). Tine reels 22 may include one or more cams to alter the angle of the tines 24 as the tine rotates about a tine reel axis 102 to improve crop pickup from the ground and also to accelerate the crop material rearwardly toward the bale chamber inlet opening 91. The resulting incoming crop mat 5 extends generally across the entire width of the pickup, assuming sufficient crop material in the windrow, as it moves rearwardly.

The inlet opening 91 to the bale chamber is laterally bounded by the side walls of the bale chamber 90. A starter roll 44 bounds the top of the inlet opening while a floor roll 42 bounds the bottom of the inlet opening. The inlet opening 91 is characterized as the position, moving in the direction of the incoming crop mat along the feed table, at which the crop material becomes engaged by rotating action of the floor 42 and starter rolls 44, and the rotation of the bale in the bale chamber. While the above description describes the upper and lower boundaries of the inlet openings as transversely arranged rolls, the present invention is equally beneficial on balers on which one or both rolls are replaced with moving belts as is well known in the art.

It is common to provide a pickup assembly 20 that is wider than the inlet opening 91 in order to improve crop gathering efficiency. In such instances, a crop converging apparatus is typically provided to laterally urge crop from the portions of the pickup assembly outboard of the inlet opening inwardly toward the inlet opening 91 of the bale chamber. The converging apparatus urges crop material laterally inwardly to establish a mat of crop material having a width matching that of the inlet opening and desired bale width, typically around four or five feet. Referring to FIGS. 2 through 5, the converging apparatus comprises a pair of augers 30 arranged on a common transverse axis 104, each partially surrounded by a crop deflecting shield 36 configured to guide the crop material into contact with the augers. The converging augers 30 each have fighting 32 configured to urge the outboard portion of the crop mat inwardly so that the outboard crop material may be directed into the narrow bale chamber inlet opening.

The addition of converging augers 30 typically requires that the feed table 26 be longitudinally elongated in the direction of incoming crop flow in order to provide the necessary space for the converging augers 30 between the tine reel 22 and the bale chamber inlet 91. Crop movement along the pickup assembly is improved by the inclusion of a rotary feeder 50 positioned between the tine reel 22 and the crop inlet opening 91.

Rotary feeder 50 comprises an axle 55 rotatably connected to the pickup assembly 20 and transversely arranged along common transverse axis 104 rearwardly from tine reel 22. Rotary feeder 50 is driven to rotate by a drive assembly (not shown), typically the same, well-known drive train powering the tine reel and other rotating elements in the pickup assembly. The rotary feeder 50 rotates in the same direction as the tine reel 22 so that the crop mat 5 is directed over the top of the rotary feeder. A plurality of shaped feed fingers 52 extend generally radially from the axle 55 and are spaced apart along a portion of the transverse width of the axle, preferably the portion forward of the bale chamber inlet opening 91 where desired crop movement is generally longitudinal. Individual feed fingers 52 are also angularly displaced around the circumference of the rotary feeder so that at least one feed finger 52 engages the crop mat regardless of the rotational orientation of the feeder 50. The feed fingers 52 engage the mat of crop material and urge it toward the inlet opening 91. The converging augers 30 are disposed on the outboard ends of the rotary feeder axle 55, laterally outboard of the feed fingers 52 where the desired crop movement is laterally inwardly.

Many balers employ cams and linkages on the tine reels to vary the radial extension of the tines based upon rotational position of the tine reel 22. The tines 24 may be retracted inwardly toward the tine reel rotational centerline 102 as they approach the rotary feeder to prevent contact with the feeder mechanism thereby allowing the longitudinal length of the feed path to be reduced. Further reduction in the separation between the tine reel rotational axis 102 and the rotary feeder rotational axis 104 is achieved in the present invention by configuring the tines 24 and the feed fingers 52 to intermesh by laterally offsetting the tines relative to the feeder fingers.

Aligning the feeder fingers 52 to pass through the space between a pair of adjacent tines allows the rotational axes 102, 104 to be arranged in closer proximity without contact between the feeder fingers and the tines.

In a similar manner, the distance separating the rotary feeder 50 and the floor roll 42 is reduced by intermeshing. Floor roll 42, typically comprising a solid cylindrical surface configured to engage the incoming crop mat and pull it into the bale chamber, now includes a plurality of circumferential grooves 62 in the roll. The depth of the grooves 62 below the outer peripheral surface 64 of the floor roll 42 is selected to achieve the desired degree of intermeshing and thus the desired reduction in the spacing between the rotary feeder rotational axis 104 and the floor roll rotational axis 106. The grooves 62 also strip crop material from the feed fingers 52 to prevent crop from being wrapped fully around the feed roll 50. To do so, the width of each groove is sufficient to allow the feed fingers to pass therethrough without contacting the floor roll grooves, while maintaining the space between the fingers and the side walls of each groove reasonable small, ideally less than an inch. Each feed finger 52 further comprises a contoured leading edge 53 having a convex arcuate shape which further aids in crop stripping by the floor roll 42 by limiting the acuteness of the angle formed between the leading edge 53 and the grooves 62 in the floor roll as each feed finger 52 approaches and passes through the groove 62. A second crop stripping apparatus 70 may be provided on the rearward side of the floor roll 42. The second crop stripping apparatus 70 includes a plurality of protrusions 72 extending into the grooves to direct crop into the bale chamber and prevent entrainment in the grooves 62 and wrapping fully around the floor roll 42.

Figure 5:
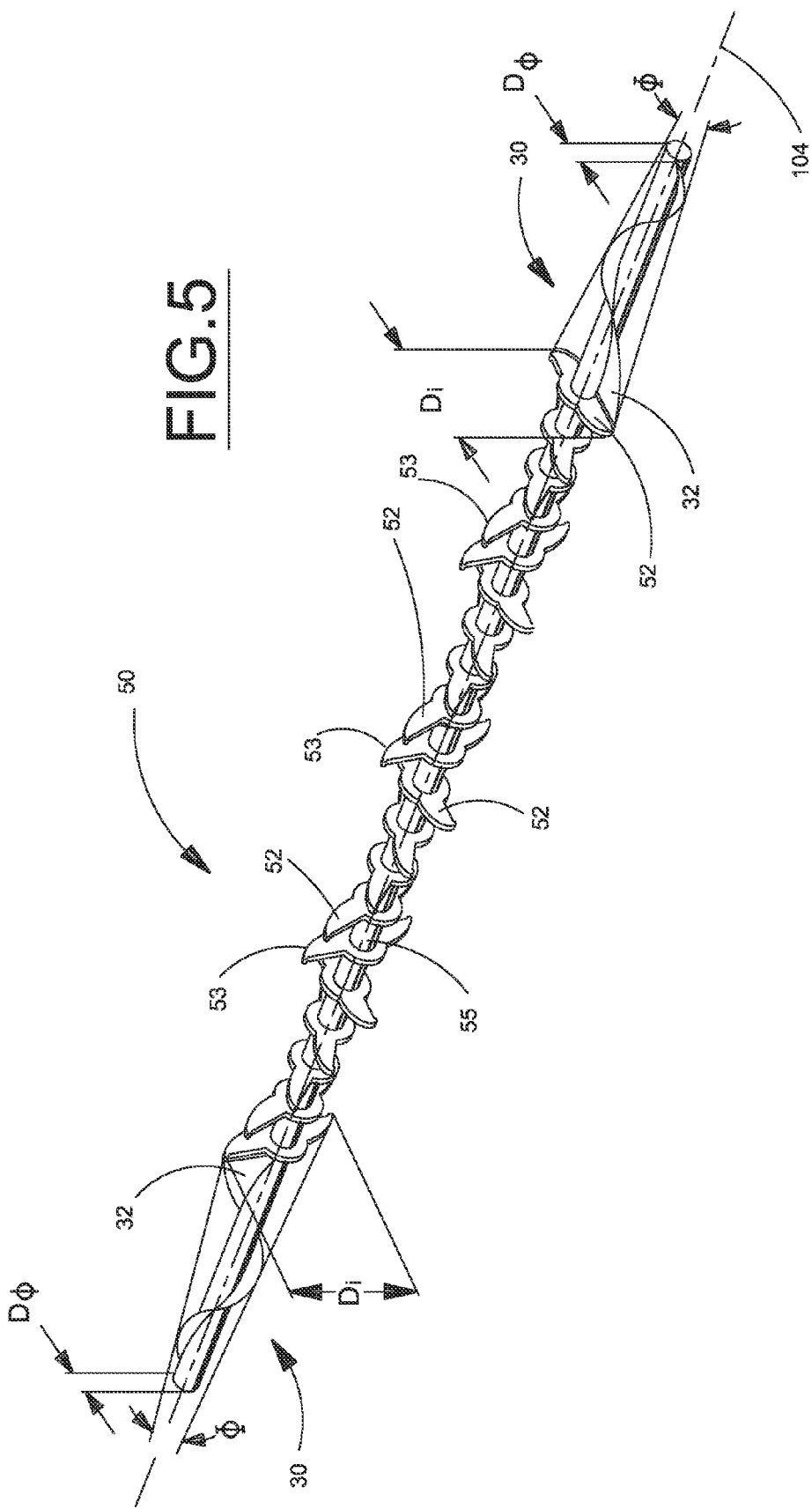
FIG. 5 is a perspective view of one embodiment of the secondary feed roll used in an intermeshed feed roll pickup assembly.

Crop movement on the pickup assembly is further enhanced by varying the peripheral diameter (D) of the converging augers 30 in relation to the distance from the outermost end thereby creating a tapered flighting profile (shown as taper angle φ in FIG. 5). The peripheral diameter of the flighting 32 is smaller at the outboard end (shown as $D_o$) and gradually increases while moving laterally inwardly toward the boundary with the feed fingers 52 on the feed roll to an inboard diameter (shown as $D_i$). The fighting peripheral diameter at the boundary between the inboard end of the flighting ($D_i$) and the feed fingers 52 is similar to the swept diameter of the feed fingers 52 to provide a smooth transition for crop moving from the converging augers to the feed fingers. The laterally increasing flighting taper is optimized to handle an increasing volume of crop material. Shielding 36 is provided adjacent to each converging auger and shaped to match the tapered profile of the converging augers 30 to minimize space for crop entrapment and collection thereby further improving lateral crop movement toward the bale chamber inlet.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A baler comprising:
   a bale forming chamber having an inlet opening,
   a pickup assembly for conveying crop material from the ground to a bale-forming chamber, said pickup assembly comprising:
   a forwardly disposed tine reel configured for rotation about a transverse tine reel axis;
   a rearwardly disposed floor roll configured for rotation about a floor roll axis, said floor roll axis being generally parallel to a tine reel axis, said floor roll having a transverse width and forming a bottom boundary of the inlet opening of the chamber and a plurality of circumferential grooves recessed into a peripheral surface and spaced apart along said transverse width wherein the floor roll is a bale forming roll of the bale chamber; and
   a rotary feeder configured for rotation on an intermediate axis, said intermediate axis being generally parallel to said tine reel axis and said floor roll axis and positioned therebetween, said rotary feeder having a plurality of generally radially extending feed fingers spaced apart along said intermediate axis, proximity of said intermediate axis; and
   wherein said floor roll and rotary feeder are positioned and configured such that said feed fingers of the rotary feeder intermesh with said circumferential grooves of said floor roll.

2. The pickup assembly of claim 1, wherein said rotary feeder further comprises in inboard feed zone substantially laterally spanning the width of the inlet opening, said plurality of feed fingers are laterally spaced apart along said inboard feed zone.

3. The pickup assembly of claim 1, wherein the inlet of the bale forming chamber is bounded at bottom by the floor roll and at the top by a starter roll; and
   wherein the inlet is the position at which crop flow is engaged by the floor roll and a starter roll and crop material in the chamber.

4. The pickup assembly of claim 3, further comprising first and second converging augers, one said converging auger connected at each opposing end of said rotary feeder and extending laterally outward from an inboard end adjacent to said inboard feed zone toward an outboard end, each said converging auger configured to laterally convey crop inwardly toward said rotary feeder.

5. The pickup assembly of claim 1, wherein an external-surface area across the circumference of the cylindrical floor roll is greater than the surface area of the groove and located radially outward of the groove with respect to the center of the roll.

6. The pickup assembly of claim 1, wherein each of said plurality of feed fingers has a leading edge configured to engage crop as said rotary feeder rotates in a feed direction, said leading edge having a convex arcuate shape when viewed in profile, said arcuate shape configured to strip crop material from said plurality of feed fingers as each of said fingers pass through a respective one of said plurality of grooves.

7. The pickup assembly of claim 1, wherein each of said plurality of grooves has a width sufficient to allow said plurality of feed fingers individually to pass through without contacting said floor roll while being sufficiently small to enable crop carried on said leading edges to be stripped from said plurality of feed fingers.

8. The pickup assembly of claim 7, wherein said plurality of feed fingers are intermeshed with tines on said tine reel.

9. A pickup assembly for conveying crop material from the ground to an inlet opening of a bale-forming chamber on a round baler, the pickup assembly having a width greater than the inlet opening, said pickup assembly comprising:
   a forwardly disposed tine reel configured for rotation about a transverse tine reel axis;
   a rearwardly disposed floor roll configured for rotation about a floor roll axis, said floor roll axis being generally parallel to said tine reel axis, said floor roll having a transverse width spanning the inlet opening and a plurality of circumferential grooves recessed into a peripheral surface and spaced apart along said transverse width; and a rotary feeder configured for rotation on an intermediate axis, said intermediate axis being generally parallel to said tine reel axis and said floor roll axis and positioned therebetween, said rotary feeder having a plurality of generally radially extending feed fingers spaced apart along said intermediate axis, proximity of said intermediate axis and said floor roll axis configured such that said feed fingers intermesh with said circumferential grooves; and a crop stripper disposed adjacent to said floor roll, said crop stripper configured to clear said plurality of grooves and direct crop material toward the bale chamber.

10. A baler comprising:

a frame-supported bale chamber comprising a crop inlet opening defined by a transversely arranged, generally cylindrical floor roll, a generally parallel and spaced apart starter roll, and a pair of generally spaced-apart side walls, the crop inlet opening configured to receive a mat of crop material from a pickup assembly;

the pickup assembly having a width greater than the inlet opening and comprising:

a tine reel forwardly connected to the pickup assembly and substantially spanning the pickup assembly width, said tine reel apparatus configured for rotation about a transverse tine reel axis, said rotation lifting crop material from the ground and conveying a mat of crop material rearwardly toward the crop inlet;

an elongate rotary feeder configured for rotation on an intermediate axis, said intermediate axis being generally parallel to said tine reel axis and positioned between said tine reel and the floor roll such that the rotary feeder engages the crop material from below, said rotary feeder having a plurality of generally radially extending feed fingers spaced apart along said intermediate axis;

wherein a plurality of circumferential grooves are recessed into said floor roll, said plurality of grooves spaced apart along the transverse width of the floor roll and circumferential extending sections of the floor roll form the side walls of at least one of the circumferential grooves wherein the floor roll is a bale forming roll configured for contacting crop within the chamber and forms a boundary of the inlet; and, the proximity of said intermediate axis and said floor roll axis configured such that said feed fingers intermesh with said circumferential grooves in the floor roll of the chamber.

11. The crop pickup assembly of claim 10, wherein said rotary feeder further comprises in inboard feed zone substantially laterally spanning the width of the crop inlet opening, said plurality of feed fingers are laterally spaced apart along said inboard feed zone.

12. The crop pickup assembly of claim 11, further comprising first and second converging augers arranged for rotation about said intermediate axis, one said converging auger connected at each opposing end of said rotary feeder for rotation therewith and extending laterally outward from an inboard end adjacent to said inboard feed zone toward an outboard end, each said converging auger configured to laterally urge crop inwardly toward said rotary feeder.

13. The crop pickup assembly of claim 12, wherein said first and said second converging augers are tapered from a minimum diameter at said outboard end to a maximum diameter at said inboard end.

14. The crop pickup assembly of claim 13, wherein each of said plurality of feed fingers has a leading edge configured to engage crop as said rotary feeder rotates in a feed direction, said leading edge having a convex arcuate shape when viewed in profile, said arcuate shape configured to strip crop material from said plurality of feed fingers as each of said fingers pass through a respective one of said plurality of grooves.

15. The crop pickup assembly of claim 14, wherein each of said plurality of grooves has a width sufficient to allow said plurality of feed fingers to pass through without contacting the floor roll and sufficiently small to enable crop carried on said leading edges to be stripped from said feed fingers.

16. The crop pickup assembly of claim 15, wherein said plurality of feed fingers are intermeshed with tines on said tine reel.

17. A crop pickup assembly for a round baler, the baler having a frame-supported bale chamber with a crop inlet opening defined by a transversely arranged, generally cylindrical floor roll, a generally parallel and spaced apart starter roll, and a pair of generally spaced-apart side walls, the crop inlet opening configured to receive a mat of crop material from the pickup assembly, the pickup assembly having a width bounded by generally opposing outboard ends that is greater than the inlet opening, the crop pickup assembly comprising:

a tine reel forwardly connected to the pickup assembly and substantially spanning the pickup assembly width, said tine reel apparatus configured for rotation about a transverse tine reel axis, said rotation lifting crop material from the ground and conveying a mat of crop material rearwardly toward the crop inlet, said tine pickup apparatus having a pickup width greater than said inlet width;

a plurality of circumferential grooves recessed into said floor roll, said plurality of grooves spaced apart along the transverse width of the floor roll; an elongate rotary feeder configured for rotation on an intermediate axis, said intermediate axis being generally parallel to said tine reel axis and positioned between said tine reel and the floor roll such that the rotary feeder engages the crop material from below, said rotary feeder having a plurality of generally radially extending feed fingers spaced apart along said intermediate axis, proximity of said intermediate axis and said floor roll axis configured such that said feed fingers intermesh with said circumferential grooves;

wherein said rotary feeder further comprises in inboard feed zone substantially laterally spanning the width of the crop inlet opening, said plurality of feed fingers are laterally spaced apart along said inboard feed zone;

first and second converging augers arranged for rotation about said intermediate axis, one said converging auger connected at each opposing end of said rotary feeder for rotation therewith and extending laterally outward from an inboard end adjacent to said inboard feed zone toward an outboard end, each said converging auger configured to laterally urge crop inwardly toward said rotary feeder and said first and said second converging augers are tapered from a minimum diameter at said outboard end to a maximum diameter at said inboard end;

each of said plurality of feed fingers having a leading edge configured to engage crop as said rotary feeder rotates in a feed direction, said leading edge having a convex arcuate shape when viewed in profile, said arcuate shape configured to strip crop material from said plurality of feed fingers as each of said fingers pass through a respective one of said plurality of grooves;

each of said plurality of grooves having a width sufficient to allow said plurality of feed fingers to pass through without contacting the floor roll and sufficiently small to enable crop carried on said leading edges to be stripped from said feed fingers;

wherein said plurality of feed fingers are intermeshed with tines on said tine reel; and a crop stripper disposed adjacent to said floor roll, said crop stripper configured to clear said plurality of grooves and direct crop material toward the bale chamber.

* * * * *